United States Patent
Bathe et al.

(10) Patent No.: US 9,989,746 B2
(45) Date of Patent: *Jun. 5, 2018

(54) LIGHT MICROSCOPE AND MICROSCOPY METHOD

(71) Applicant: Carl Zeiss Microscopy GmbH, Jena (DE)

(72) Inventors: Wolfgang Bathe, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/442,937

(22) Filed: Feb. 27, 2017

(65) Prior Publication Data

US 2017/0192216 A1 Jul. 6, 2017

Related U.S. Application Data

(63) Continuation of application No. 14/762,930, filed as application No. PCT/EP2014/051301 on Jan. 23, 2014, now Pat. No. 9,671,600.

(30) Foreign Application Priority Data

Jan. 25, 2013 (DE) .................. 10 2013 001 238

(51) Int. Cl.
G02B 21/00 (2006.01)
G02B 21/02 (2006.01)
G02B 27/58 (2006.01)

(52) U.S. Cl.
CPC ....... G02B 21/0072 (2013.01); G02B 21/008 (2013.01); G02B 21/0032 (2013.01);
(Continued)

(58) Field of Classification Search
CPC ............ G02B 21/0072; G02B 21/0032; G02B 21/0044; G02B 21/0076; G02B 21/008; G02B 27/58
(Continued)

(56) References Cited

U.S. PATENT DOCUMENTS 3,013,467 A * 12/1961 Minsky ................ G02B 21/002
250/215
3,926,500 A * 12/1975 Frosch ................. G02B 21/082
359/235

(Continued)

FOREIGN PATENT DOCUMENTS

EP 1359452 * 11/2003 ............. G02B 21/00
EP 2317362 * 5/2011 ............. G02B 21/00

(Continued)

OTHER PUBLICATIONS

York, Andrew G., et al.; Resolution doubling in live, multicellular organisms via multifocal structured illumination microscopy:; Nature Methods; 2012; 9(7): 745-756.*

(Continued)

*Primary Examiner* — Frank Font
(74) *Attorney, Agent, or Firm* — Duane Morris LLP

(57) ABSTRACT

An optical microscope having a sample plane for positioning a sample, and a light source for emitting illumination light, includes optical imaging means for guiding the illumination light into the sample plane. A detector device having a plurality of detector elements for detecting sample light coming from the sample. Adjacent detector elements are at a distance from one another which is smaller than an Airy-Disk produced by a point of the sample plane on the detector device. A scanning device has at least a first and a second optical arrangement simultaneously movable in a common direction for producing an illumination scanning movement and a detection scanning movement, which are (Continued)

opposite to one another. Sample regions spaced apart from one another can be examined simultaneously, such that both a beam path of the sample light from the sample plane to the detector device and a beam path of the illumination light from the light source to the sample plane run via the first optical arrangement and only one of these two beam paths runs via the second optical arrangement.

17 Claims, 7 Drawing Sheets

(52) U.S. Cl.
CPC ..... *G02B 21/0044* (2013.01); *G02B 21/0076* (2013.01); *G02B 21/025* (2013.01); *G02B 27/58* (2013.01)

(58) Field of Classification Search
USPC ................................................. 359/385, 389
See application file for complete search history.

(56) References Cited

U.S. PATENT DOCUMENTS

| | | | | |
|---|---|---|---|---|
| 5,296,703 | A * | 3/1994 | Tsien ................. | G02B 21/0076 250/235 |
| 5,428,475 | A * | 6/1995 | Tanaami ............. | G02B 3/0056 359/234 |
| 6,201,639 | B1 * | 3/2001 | Overbeck ............ | B01L 3/0241 359/225.1 |
| 6,248,988 | B1 * | 6/2001 | Krantz ................ | G02B 21/004 250/201.3 |
| 6,399,935 | B1 * | 6/2002 | Jovin ................. | G02B 21/0032 250/216 |
| 7,468,834 | B2 * | 12/2008 | Wolleschensky .. | G01N 21/6458 359/370 |
| 7,808,701 | B2 * | 10/2010 | Ouchi ................... | G02B 21/16 359/368 |
| 7,978,403 | B2 * | 7/2011 | Brueck ................. | G02B 21/18 356/450 |
| 9,671,600 | B2 * | 6/2017 | Bathe ................. | G02B 21/0044 |
| 2008/0218849 | A1 * | 9/2008 | Uhl .................... | G02B 21/0032 359/368 |
| 2009/0147354 | A1 * | 6/2009 | Arbuckle ............. | G02B 21/00 359/368 |
| 2009/0161208 | A1 * | 6/2009 | Kempe ............. | G02B 21/0032 359/385 |
| 2009/0219607 | A1 * | 9/2009 | Saggau ............. | G02B 21/0016 359/305 |
| 2011/0261446 | A1 * | 10/2011 | Dunsby ............. | G02B 21/0076 359/380 |
| 2011/0267688 | A1 * | 11/2011 | Kleppe ............. | G02B 21/0036 359/385 |
| 2012/0281258 | A1 * | 11/2012 | Sheblee ............. | G02B 21/0044 358/474 |
| 2014/0146376 | A1 | 5/2014 | Kleppe et al. | |

FOREIGN PATENT DOCUMENTS

| | | | | |
|---|---|---|---|---|
| EP | 2520965 | * | 11/2012 | ............ G02B 21/00 |
| JP | H09133870 A | * | 5/1997 | ........... G02B 1/0044 |

OTHER PUBLICATIONS

Sheppard C.J.R.; "Super-resolution in Confocal Imaging"; Optik; 1988; 80(2):53-54.*
Notification of Transmittal of Translation of the International Preliminary Report on Patentability, International Prelim Report on Patentability & Written Opinion, dated Aug. 14, 2015.*

* cited by examiner

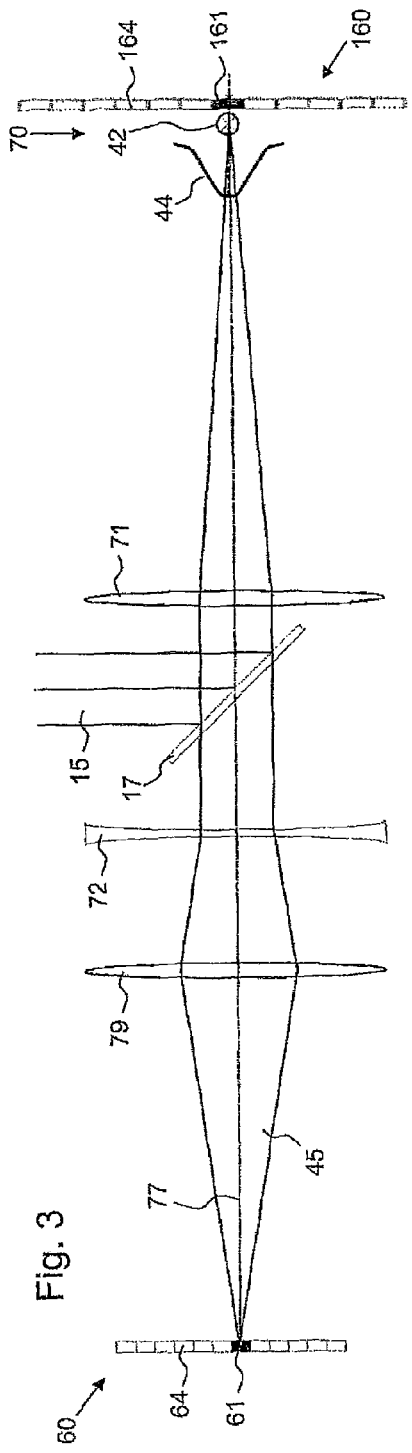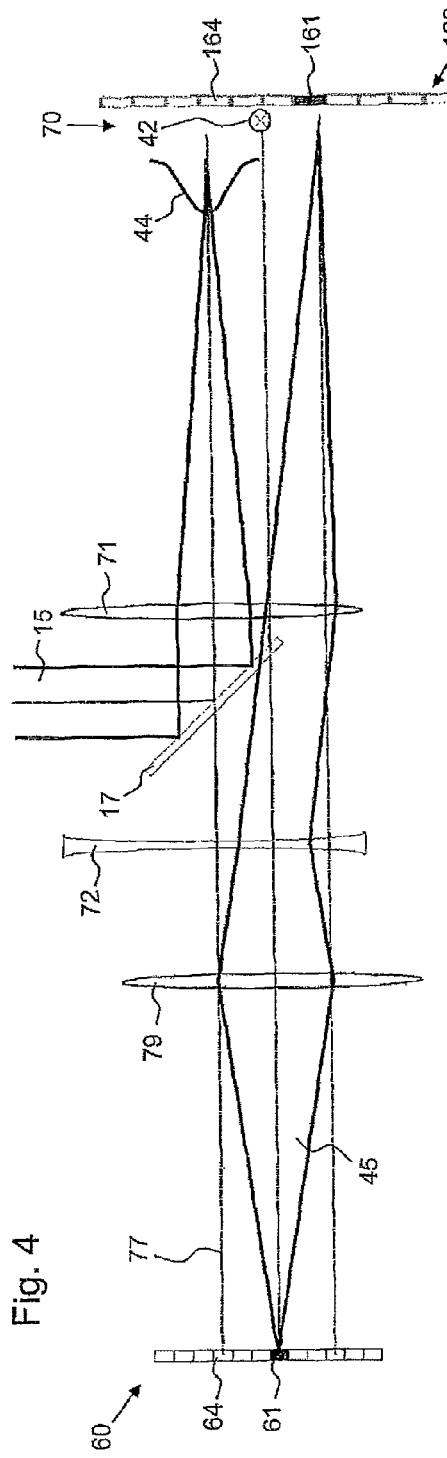

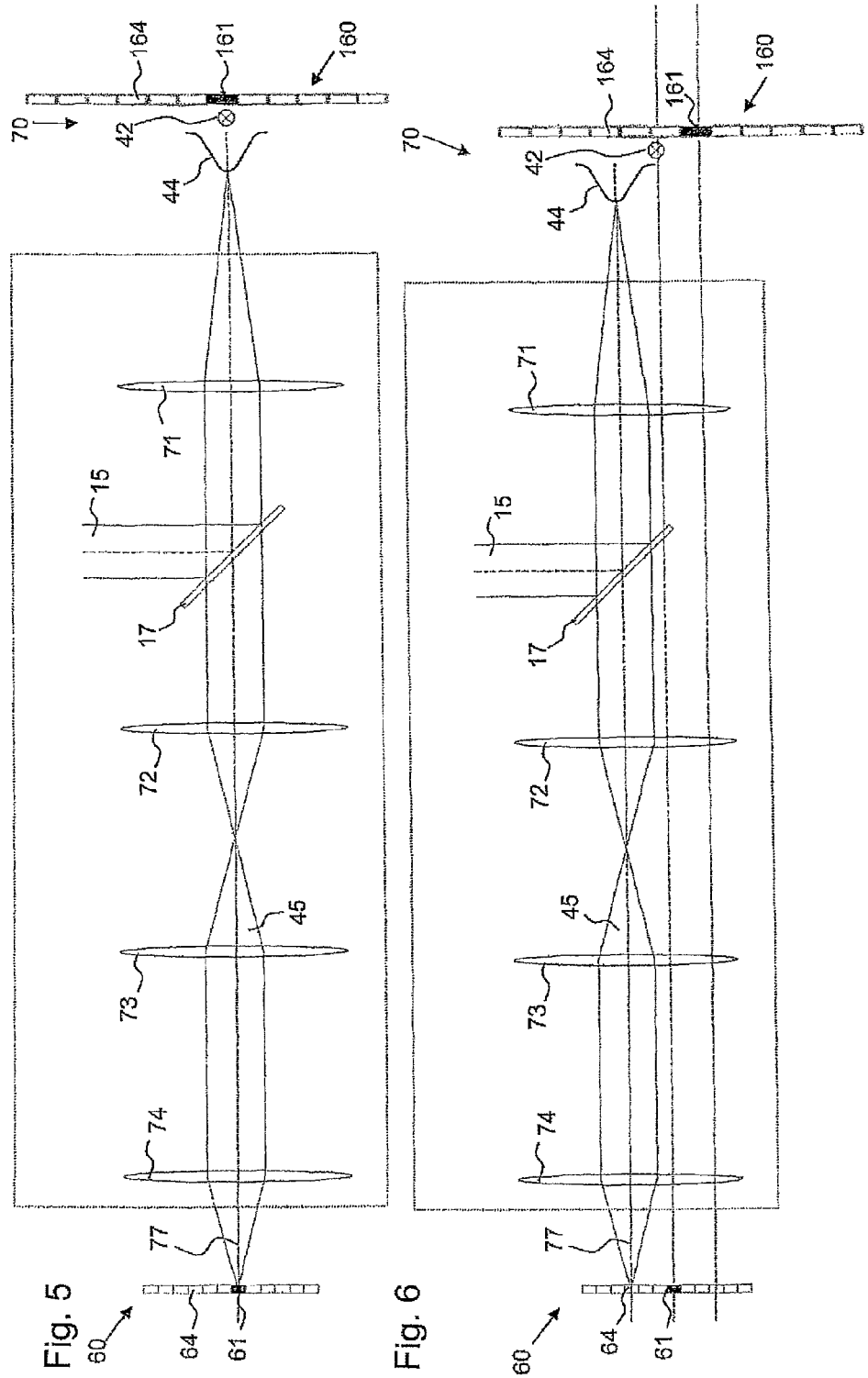

LIGHT MICROSCOPE AND MICROSCOPY METHOD

RELATED APPLICATIONS

The present application is a continuation of U.S. application Ser. No. 14/762,930, filed on Jul. 23, 2015 as a U.S. National Stage application of International PCT Application No. PCT/EP2014/051301 filed on Jan. 23, 2014 which claims priority benefit of German Application No. DE 10 2013 001 238.4 filed on Jan. 25, 2013, the contents of each of the foregoing are hereby incorporated by reference in their entirety, and Applicant hereby claims priority to PCT/EP2014/051301.

BACKGROUND

The present invention relates generally to a light microscope and to a method of microscopy.

A light microscope of the generic type has a sample plane, in which a sample to be examined is positionable, a light source for emitting illumination light, optical imaging means for guiding the illumination light into the sample plane, and a detector device for detecting sample light coming from the sample, wherein adjacent detector elements are at a distance from one another which is smaller than an Airy disk produced by a point in the sample plane on the detector device. Electronic means can determine an image of the sample on the basis of the detected sample light.

In a microscopy method of the generic type, for examining a sample positioned in a sample plane of a light microscope, illumination light is guided into the sample plane, the illumination light is moved as illumination scanning movement over the sample plane, and sample light coming from the sample is detected by means of a detector device having a plurality of detector elements. Adjacent detector elements are at a distance from one another which is smaller than an Airy disk produced by a point in the sample plane on the detector device. In this case, electronic means can determine an image of the sample on the basis of the detected sample light.

In the case of such light microscopes and microscopy methods a fundamental aim is that of generating a sample image with the highest possible resolution and the best possible signal-to-noise ratio.

For this purpose, the light microscope of the generic type and the microscopy method make use of detector elements which are smaller than an Airy disk produced by a point in the sample plane on the detector device.

The Airy is defined by means of the first zeros of the rotationally symmetrical light distribution of a diffraction-limited illumination spot. An Airy is thus an extent of a diffraction disk in an image plane which is brought about by a point in the sample plane. The extent can be defined as the distance between the first zeros of the diffraction disk. A diffraction-limited light distribution having the size of an Airy has a radius of 0.61 $\lambda$/NA. In this case, $\lambda$ is the light wavelength and NA is the numerical aperture.

Expediently, the distance between adjacent detector elements can be less than half or one third of an Airy disk. As a result, a point of the sample plane is always imaged onto a plurality of adjacent detector elements.

Insights regarding what measures can achieve an increase in resolution here go back to C. Sheppard and are described in the article "Super-resolution in Confocal Imaging" by Colin Sheppard et al., published in Optik 80, No. 2, 45 (1988). For increasing the resolution in the sample image, in this case image recording is followed by resorting and computation of the image data by means of a special algorithm, which is also referred to as accumulation of displaced sub-Airy detector values.

Such a method is explained with reference to FIG. 1, which schematically illustrates a sample along the x-axis of a sample plane. The sample has a sample point 42 or a fluorescent object 42. An illumination spot 44 is also illustrated. The intensity I thereof is specified on the ordinate. The dimensions of the illumination spot 44 can be diffraction-limited and are larger than the object 42 in the x-direction. If the illumination spot 44 impinges on the object 42, the latter is excited to fluorescence and emits sample light which can be detected by a detector device.

FIG. 1 furthermore illustrates an imaging, here infinitely sharp, of such a detector device 60 into the sample plane. The detector device 60 comprises a plurality of detector elements 63, 64. The latter not only receive sample light which emerges from a point of the sample plane, but an extensive receiving region is imaged onto each detector element, said region being determined by the PSF (point spread function) of the imaging. The PSF for the detector element 64 is illustrated as a dashed curve 46. The dimensions of the illumination spot 44 can likewise be determined by a PSF of a point light source.

The measured light intensity of a specific detector element 64 is then determined by a total PSF, which is the product of the PSF with regard to the illumination spot 44 and the PSF 46 with regard to the detector element 64. The maximum of the total PSF lies approximately centrally between the illumination spot 44 and the PSF 46 of the respective detector element 64. In the example illustrated, the detector element 64 therefore receives light principally from a location 61A lying centrally between the illumination spot 44 and the PSF 46. By contrast, the detector element 64 measures hardly any light from the position 61D, even though the associated PSF 46 has its maximum at said position.

For the purpose of scanning the sample, the illumination spot is then displaced from the position 44D to 44B, for example. This is designated as illumination scanning movement in the present case. The total PSF of the detector element 64 shifts as a result. Said detector element then no longer measures light from principally the position 61A, but rather 61B.

This circumstance can be used for increasing the resolution. For this purpose, the detector elements with regard to each position of the illumination spot 44 are read. The sample light signals measured in this case are assigned to different sample regions depending on the position of the illumination spot 44. That is to say that the sample light signals measured by one and the same detector element are resorted depending on the position of the illumination spot 44.

The resorting is illustrated by the curved arrows. Accordingly, a signal of the detector element 64 is assigned to the location 61A of the object 42 if an illumination spot is situated at the location 44D. Analogously, a signal of the detector element at the location 61C is assigned to the location of the object 42 in the case of an illumination spot at the location 44C. Moreover, a signal of the detector element 61B is assigned to the location of the object 42 in the case of an illumination spot at the location 44B.

An improvement of the resolution can be achieved in this way. The apparatus outlay for achieving this resorting is high, however. In addition, a time requirement for calculating the resorting is comparatively high.

The improvement of the resolution can also be described as greater weighting of the higher spatial frequencies in the optical transfer spectrum of a single-spot system. Since the light distribution within a 1-Airy pinhole diameter is used for the image generation, more photons can be detected. The signal-to-noise ratio is thus improved.

Comparable microscopes that use detection with sub-Airy resolution are described in EP 2 520 965 A1 and in York et al., Nature Methods Vol. 9, 749-754 (2012). A multi-spot illumination is additionally used. In this case, each light spot is scanned successively over different sample regions. In this regard, although an increase in speed can be achieved during the scan it is necessary to read out images recorded in each case by the detector device for different scan positions and to compute them as described previously, see for example "supplementary note 1" of the article by York et al. As a result, the image recording speed is reduced, which is disadvantageous particularly for the imaging of living cells. Moreover, computation and/or motion artefacts can arise in the image.

In order to examine a sample with increased resolution, structured illumination microscopy (SIM) has additionally become established. This uses structured illumination light which can be generated by line gratings, for example.

In the case of a laser scanning microscope (LSM), an illumination spot is used as structured illumination. Here an increased resolution is achieved by means of a confocal imaging for which a pinhole, that is to say a pinhole stop, is positioned in or on an image plane. In the case of an LSM, however, the signal-to-noise ratio is comparatively low since only a comparatively small proportion of light is used.

For simultaneously examining a plurality of sample regions, it is possible to use a microscope with a Nipkow disk. The latter comprises a plurality of pinholes arranged as Archimedean spirals. Such microscopes are described in U.S. Pat. No. 5,428,475 A and US 2008/0218849 A1.

As a result of the Nipkow disk being arranged in the common illumination and detection beam path, off-focus light is filtered. A rapid image recording can be achieved with this comparatively simple construction by rotation of the Nipkow disk. The latter is therefore also referred to as a spinning disk. The simultaneous transillumination of a plurality of pinholes of the Nipkow disk, a so-called multi-spot examination, can accelerate the sample examination further. A microscope with this construction is described in EP 1 359 452 A1. In order to guide a greater proportion of the illumination light through the pinholes of the Nipkow disk, a micro-focusing lens disk is used in this case. The latter is rotated jointly with the Nipkow disk. Sample light is likewise guided through said micro-focusing lens disk and is subsequently guided by means of a further micro-focusing lens disk in the direction of a detector.

The range of the optical limit resolution can be achieved only with a poor signal-to-noise ratio in the case of such known spinning disk microscopes.

SUMMARY

The problem addressed by the invention can be considered that of providing a light microscope and a microscopy method in which the highest possible measurement resolution in conjunction with short measurement times is made possible in a cost-effective manner.

The problem is solved by means of a light microscope having the features of claim 1 and a microscopy method having the features of claim 13.

Preferred embodiment variants of the method according to the invention and of the light microscope according to the invention are the subject of the dependent claims and are explained in the following description, in particular in association with the figures.

According to the invention, the light microscope of the abovementioned type has a scanning device with at least one first and one second optical arrangement. The optical arrangements of the scanning device are movable simultaneously in a common direction for the purpose of producing an illumination scanning movement and a detection scanning movement, which are opposite to one another. In this case, the illumination scanning movement is a scanning movement of illumination light over the sample plane, and as detection scanning movement receiving regions of the detector elements are movable over the sample plane. The first and second optical arrangements each have a plurality of optical elements which are arranged alongside one another and by means of which sample regions spaced apart from one another are examinable simultaneously. In this case, the first and second optical arrangements are arranged such that both a beam path of the sample light from the sample plane to the detector device and a beam path of the illumination light from the light source to the sample plane run via the first optical arrangement and only one of these two beam paths runs via the second optical arrangement. In order to achieve a direction of the detection scanning movement which is opposite to the direction of the illumination scanning movement, by means of the optical arrangements of the scanning device, sample light is imagable in a non-inverting manner and with an imaging scale of less than 1.

The microscopy method of the present invention provides optical arrangements of a scanning device to be moved simultaneously in a common direction for the purpose of producing an illumination scanning movement and a detection scanning movement, which are opposite to one another, and detection scanning movement receiving regions of the detector elements being moved over the sample plane. Sample regions spaced apart from one another are examined simultaneously by means of the first and second optical arrangements, each having a plurality of optical elements arranged alongside one another, wherein the first and second optical arrangements are arranged such that illumination light and sample light are guided via the first optical arrangement and that, via the second optical arrangement, only either illumination light is guided toward the sample plane or sample light is guided toward the detector device. In order to achieve a direction of the detection scanning movement which is opposite to the direction of the illumination scanning movement, by means of the optical arrangements of the scanning device, sample light is imaged in a non-inverting manner and with an imaging scale of less than 1.

Preferably, the microscopy method according to the invention is carried out with a microscope according to the invention.

In order to simultaneously examine different sample regions, in this case the illumination light is split into partial beams by optical elements of the first and/or second optical arrangement, which partial beams are guided onto sample regions spaced apart from one another. Sample light is emitted by the illuminated sample regions. Said sample light is forwarded as partial beams by the optical elements of the first and/or second optical arrangement to the detector unit.

The sample region from which a specific detector element receives the highest quantity of light is dependent on the position of the illumination pattern or illumination spot on the sample. This has been explained in greater detail with reference to FIG. 1. As a result of the illumination scanning movement, the illumination pattern is displaced on the sample. As a result, the total PSF also shifts, and thus so does the sample region from which a specific detector element receives the highest quantity of light.

A major advantage of the invention, achieved by means of the detection scanning movement, is that a specific detector element receives light principally from always the same sample region. The location of the maximum of the total PSF is therefore altered as marginally as possible by the illumination and detection scanning movement. For this purpose, the detection scanning movement must be opposite to the illumination scanning movement and must take place simultaneously therewith.

The effect of the opposite movement between the detection scanning movement and the illumination scanning movement is explained with reference to FIG. 1. In the situation illustrated, the detector element 64 principally receives light from the region 61A. The total PSF has its maximum here. As illumination scanning movement, the illumination spot 44 is then moved in the direction of the arrow 81, for example until its maximum lies at the position 44C. As detection scanning movement, the receiving region of the detection element 64 is simultaneously moved in the opposite direction, that is to say in arrow direction 82. The receiving region of the detection element 64 can be regarded as the extent of the PSF 46 thereof up to the first minima of the PSF 46. If the latter is moved in arrow direction 82 until its maximum lies at the position 61C, then the maximum of the total PSF of the detector element 64 is still situated at the position 61A. Advantageously, this makes it possible to avoid the resorting described with regard to the prior art, in which the reception signals of a specific detector element are assigned to different sample positions depending on the position of the illumination spot.

A direction indication of the illumination scanning movement corresponds to the direction in which the partial light beams of the illumination light move on the sample.

The detection scanning movement is a movement of the receiving region of a specific detector element in the sample plane. The receiving region of a detector element is that region in the sample plane from which the detector element receives light. The receiving region is determined by the PSF of the imaging between sample plane and image plane and also by the dimensions of the associated detector element. A receiving region can also be exhibited as imaging of the associated detector element into the sample plane.

The illumination scanning movement and the detection scanning movement are opposite if, in the sample plane, the receiving regions of the detector elements are moved oppositely to the partial beams of the illumination light.

By virtue of the fact that resorting of the recorded signals is no longer necessary, even a single image output by the detector device has an increased resolution with a good signal-to-noise ratio. In addition, off-focus sample light is reduced.

An essential concept of the invention can be considered that of providing optical arrangements which, during a common movement in a common direction, produce an illumination scanning movement and a detection scanning movement opposite thereto. For this purpose, it is firstly necessary that not all of the optical arrangements are used both for illuminating the sample and for detecting sample light. Rather, only one of the optical arrangements guides both sample light in the direction of the detector device and illumination light in the direction of the sample plane. This optical arrangement can expediently be the first optical arrangement, which is arranged in the beam path nearer to the sample plane than the second optical arrangement. By contrast, in one embodiment, the second optical arrangement is used solely for guiding illumination light onto the first optical arrangement and further to the sample plane. By contrast, sample light here does not reach the second optical arrangement, or in any case not sample light which is guided to the detector device.

In another embodiment, the second optical arrangement is used solely for guiding sample light toward the detector device, while illumination light on the way to the sample plane is not guided onto the second optical arrangement.

It is furthermore necessary for the optical arrangements to image sample light in a non-inverting manner and with an imaging scale of less than 1. The need for complex coordination between the illumination scanning movement and the detection scanning movement is then advantageously obviated.

Major speed advantages are also achieved in the case of the invention by nature of the fact that a plurality of sample regions that are spatially separate from one another can be examined simultaneously. For this purpose, the optical arrangements each have a plurality of optical elements. Illumination light is then radiated simultaneously onto a plurality of optical elements of the first optical arrangement. Each of the irradiated optical elements then forwards a partial beam. The different partial beams are guided onto mutually non-overlapping sample regions. A multi-spot illumination is thus provided. As a result of the movement of the optical arrangements used for the illumination light, the partial beams are displaced, whereby the illumination scanning movement is produced.

Via the optical elements of the optical arrangements used for the sample light, a plurality of mutually non-overlapping sample regions are imaged onto different regions of the detector device. In this case, the number of simultaneously examined sample regions corresponds precisely to the number of optical elements of the first optical arrangement which the illumination light irradiates simultaneously.

Preferably, the speeds of the detection scanning movement and of the illumination scanning movement are identical in terms of absolute value. This is determined by the imaging scale with which the optical arrangements image sample light. For speeds having identical absolute value, the imaging scale is 1:2.

All of the optical arrangements of the scanning device by which the sample light passes to the detector device jointly produce a non-inverted imaging. Particularly if exactly two optical arrangements are used for the sample light, for the purpose of the non-inverted imaging, the optical elements of the first or second optical arrangement each can have a light-converging effect and the optical elements of the other optical arrangement each can have a light-diverging effect. If sample light is guided via both optical arrangements to the detector device, the optical elements of the first optical arrangement can each have a light-converging effect and the optical elements of the second optical arrangement can each have a light-diverging effect. Consequently, the optical elements of the first optical arrangement together with the associated optical elements of the second optical arrangement can in each case form a Galilean telescope. Associated optical elements of different optical arrangements should be understood to mean in each case such optical elements which forward the same partial beam of the sample light.

If the sample light is guided solely via the first optical arrangement to the detector device, the optical elements of the first optical arrangement can have a light-diverging effect. A non-inverted, virtual imaging of the sample light can thus be achieved. In this case, the illumination light can be guided as a parallel beam onto optical elements of the second optical arrangement and further to the first optical arrangement. The optical elements of the second optical arrangement can have a light-converging effect and a focal length that is shorter than that of the light-diverging optical elements of the first optical arrangement. As a result, illumination light is focused into an intermediate image plane.

The scanning device can also have further optical arrangements, which are arranged in the beam path of the sample light and are movable simultaneously in a common direction. In this regard, one or a plurality of image field rotators, for example Abbe-Konig prisms, can be present as third optical arrangement. In this case, inverted imagings are generatable by means of the first optical arrangement or by means of the first and second optical arrangements, which inverted imagings are convertible into non-inverted imagings by the image field rotation of the image field rotator or rotators.

In addition, the scanning device can have a third and a fourth optical arrangement as image field rotators, said optical arrangements each having an optical element for each of the optical elements of the first optical arrangement. By way of example, the optical elements of the third optical arrangement together with the respectively associated optical elements of the fourth optical arrangement can form Kepler telescopes. The latter generate an inverted imaging and thus serve as image field rotators. If the beam path of the sample light runs from the sample plane to the detector device via the first and second optical arrangements, then the optical elements of the first optical arrangement jointly with the associated optical elements of the second optical arrangement can likewise be embodied in each case as a Kepler telescope. In this case, in particular, the optical elements of the first and second optical arrangements each have a light-converging effect.

By virtue of a light-converging effect of the optical elements of the first optical arrangement, the partial beams of the illumination light can be focused into an intermediate image plane. A pinhole stop arrangement can be provided here. Consequently, a pinhole stop arrangement, which is movable jointly with the first and second optical arrangements, is present for the purpose of generating a confocal sample image between the first optical arrangement and the sample plane. In this case, the pinhole stop arrangement preferably has a respective pinhole stop for each optical element of the first optical arrangement.

In principle, the optical arrangements of the scanning device can have an arbitrary form. Moreover, the optical elements of an optical arrangement can be positioned arbitrarily with respect to one another, in principle, and the movements of the optical arrangements can take place in an arbitrary, common direction.

Preferably, however, the optical arrangements are embodied in each case by a rotatable disk. The illumination light is guided onto a part of one of the rotatable disks. The illumination scanning movement is thereby carried out along a circle segment and in a rotation direction. The detection scanning movement runs along a circle segment oppositely to the rotation direction.

In order to ensure synchronous rotation of the rotatable disks, the rotatable disks are preferably mounted on a common driveshaft. Mutually different driveshafts that are driven by a common motor can also be provided.

The optical elements can be arranged in a spiral shape on the rotatable disks, in particular as Archimedean spirals.

In an alternative embodiment, an actuating device for linearly displacing the optical arrangements is present. For example, piezoelectric actuators can be used for this purpose. In this case, the optical elements of an optical arrangement can also be positioned in checkered fashion.

The optical elements of the optical arrangements can be of arbitrary type, in principle, as long as they have a light-converging or light-diverging effect. The optical elements of the different optical arrangements can be formed for example in each case by at least one lens, a mirror or a light-diffracting element. Fresnel lenses can be used as light-diffracting elements.

A comparatively simple beam path can be achieved if all the optical elements are formed by lenses. In this case, a beam splitter can be arranged between the first and second optical arrangements. Said beam splitter guides illumination light through the first optical arrangement, without the illumination light previously passing through the second optical arrangement. The beam splitter simultaneously allows sample light coming from the first optical arrangement to be at least partly transmitted to the second optical arrangement.

The lenses can be embodied as an achromat or aspheres and, in principle, can also consist of in each case one or a plurality of lens groups.

Alternatively, the optical elements of the first optical arrangement can also be lenses and those of the second optical arrangement mirrors. Partial beams of the sample light that are reflected by the second optical arrangement can then be guided via a further beam splitter in the direction of the detector device.

Mirrors can also be used for the optical elements of the first optical arrangement, for example if a further beam splitter is provided.

One preferred value of the above-described imaging scale of the optical arrangements is 0.5. This value is particularly suitable if the PSF with which a point light source is imaged into the sample plane and the PSF with which a sample point is imaged have the same width. This is the case for example for the curves 44 and 46 from FIG. 1. As a result, the speeds or step sizes of the illumination and detection scanning movements should be identical in terms of absolute value. This is achieved precisely by an imaging scale of the optical arrangements of the scanning device of 0.5. However, if the two PSFs have different widths or forms, a different imaging scale may be preferred. This may be the case, in particular, if the wavelengths of the sample light and of the illumination light differ from one another, for example in the case of fluorescence measurements. More generally, therefore, an imaging scale of between 0.3 and 0.7 is chosen. For particularly precise measurements, the imaging scale can also be variably adjustable. For this purpose, the scanning device can have a zoom optical arrangement. The latter is movable jointly with the first optical arrangement and is arranged such that the sample light solely passes through it during operation. The zoom optical arrangement can have in each case one zoom optical unit per optical element of the first optical arrangement.

In one preferred variant of the microscopy method according to the invention, illumination and detection scanning movements are carried out during an integration time of the detector elements. Therefore, the detector elements are not read separately for different positions of the optical arrangements, as is necessary for resorting in accordance with the prior art. Rather, the detector elements can continuously integrate sample light signals received for the recording of a sample image, while the optical arrangements of the scanning device are moved.

Advantageous variants of the method according to the invention additionally arise as a result of the operation of the configurations of the light microscope according to the invention. In this case, the electronic means are preferably designed for automatically implementing the method variants described above.

BRIEF DESCRIPTION OF THE DRAWINGS

Further features and advantages of the invention are described below with reference to the enclosed schematic figures, in which:

FIG. 3 shows components of one embodiment of a light microscope according to the invention, wherein the scanning device is situated in a specific position;

FIG. 4 shows the components from FIG. 3, wherein the scanning device is situated in a different position than in the case of FIG. 3;

FIG. 5 shows components of a further embodiment of a light microscope according to the invention, wherein the scanning device is situated in a specific position, FIG. 6 shows the components from FIG. 5, wherein the scanning device is situated in a different position than in the case of FIG. 5;

DETAILED DESCRIPTION OF EMBODIMENTS OF THE INVENTION

Identical and identically acting components are generally provided with the same reference signs in the figures.

Figure 2:
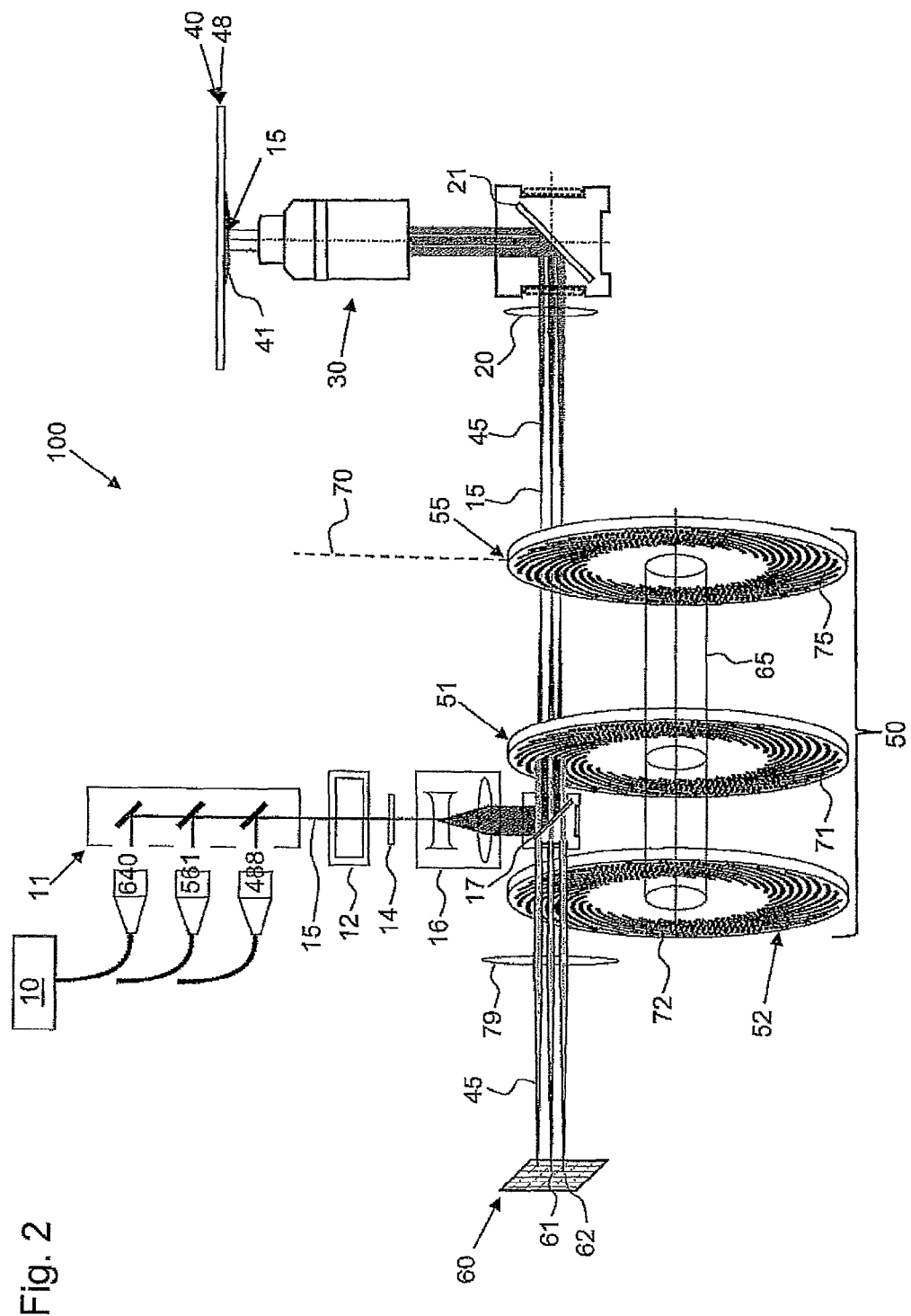
FIG. 2 shows one exemplary embodiment of a light microscope according to the invention.

FIG. 2 schematically shows one exemplary embodiment of a light microscope 100 according to the invention. As essential components said light microscope comprises a light source 10 for emitting illumination light 15, a sample plane 40, in which a sample 41 to be examined is positionable, a detector device 60 for detecting sample light 45, and a scanning device 50.

An illumination scanning movement of the illumination light 15 over the sample plane 40 is carried out by means of the scanning device 50. In addition, the scanning device 50 displaces receiving regions in the sample plane 40 from which specific detector elements 61, 62 of the detector device receive sample light. This movement is designated as detection scanning movement. By virtue of the specific design of the scanning device 50, the illumination scanning movement and the detection scanning movement are always opposite to one another.

The light source 10 can comprise a plurality of laser modules. Illumination light emitted by the latter is guided via optical fibers to a mirror staircase 11. The latter combines the beam paths of the laser modules into a common beam path. The illumination light 15 is then guided via an acousto-optical tunable filter (AOTF) 12, a polarization variator 14 and a telescope for beam expansion 16 to the beam splitter 17.

Particularly in the case of objectives having a very large numerical aperture, the resolution is influenced by the polarization of the illumination light. In the case of linear polarization, a higher resolution is achieved perpendicularly to the polarization direction than parallel thereto. In the case of circular polarization, the lateral resolution is direction-independent and of medium magnitude. The polarization can be set in a desired manner by means of the polarization variator 14. By way of example, a plurality of images of the sample can be recorded successively with different polarization directions. These images can subsequently be computed to form a single image having an increased resolution in each lateral direction.

By means of the beam splitter 17, a common beam axis for illumination and sample light is produced between the sample plane 40 and the beam splitter 17. Illumination light 15 is reflected at the beam splitter 17 at least partly in the direction of the sample plane 40. Sample light 45 is transmitted at the beam splitter 17 at least partly in the direction of the detector device 60. For this purpose, the beam splitter 17 can be embodied as a neutral splitter. In order that the sample light of weaker intensity is not unnecessarily attenuated, the beam splitter 17 preferably transmits more than 60% of the impinging light.

For fluorescence measurements, the beam splitter 17 can also be embodied as a chromatic splitter which transmits or reflects light in a wavelength-dependent manner. Alternatively, the beam splitter 17 can also transmit or reflect light in a polarization-dependent manner, which likewise achieves the effect that sample light 45 is transmitted for the most part and illumination light 15 is reflected for the most part. In order to enable measurements with illumination light 15 having different polarization, the polarization-dependent beam splitter 17 can also be rotatable.

By means of the beam splitter 17, sample light 45 is guided onto a first optical arrangement 51 of the scanning device 50. The first optical arrangement 51 is embodied here as a rotating disk and comprises a plurality of optical elements 71. In the example illustrated, the optical elements 71 are lenses which focus the illumination light 15 into an intermediate image plane 70. By virtue of the fact that the illumination light 15 impinges on a plurality of optical elements 71, the illumination light 15 is forwarded in the form of a plurality of partial beams spaced apart from one another.

A pinhole stop arrangement 55 is present in the intermediate image plane 70. Said arrangement is likewise embodied as a rotatable disk and comprises a plurality of pinhole stops 75 through which the partial beams of the illumination light 15 are guided. The size of the pinhole stops is chosen such that the focused partial beams of the illumination light 15 can pass through completely or are trimmed at the edge.

A pattern of the illumination light 15 in the intermediate image plane 70 is then imaged into the sample plane 40. A tube lens 20, beam deflection means 21 and an objective 30 are present for this purpose in the example illustrated. The scale factor determined by the focal lengths of the tube lens 20 and of the objective 30 can be chosen arbitrarily, in principle, in accordance with the intended examination.

By means of a sample displacement unit 48, a sample 41 can be moved in the sample plane 40 and/or perpendicularly thereto.

The sample 41 is illuminated by partial beams of the illumination light 15 and emits sample light 45 as a consequence. Said sample light can be scattered illumination light or luminescent light, that is to say fluorescent of phosphorescent light. The sample light is imaged into the intermediate image plane 70 by the objective 30 and the tube lens 20. The pinhole stops 75 situated there allow sample light 45 from the focal plane of the sample 41 largely to pass, while they largely filter out sample light 45 which does not originate from the focal plane. The degree of this suppression is dependent on the hole diameter.

The sample light 45 likewise comprises a plurality of partial beams that emerge from the different illuminated regions of the sample 41. The portions of the partial beams of the sample light 45 which pass through the pinhole stops 55 are collimated by means of the lenses 71 of the first optical arrangement 51. In particular, they can be transmitted as parallel beams through the beam splitter 17 and can be guided to optical elements 72 of a second optical arrangement 52 of the scanning device 50. In the example illustrated, the optical elements 72 are lenses and are positioned such that each partial beam of the sample light 45 impinges on a different optical element 72.

The properties of the optical elements 72 are crucial for the opposite directions of the illumination and detection scanning movements. This will be described in greater detail later.

The second optical arrangement 52 is followed by a focusing optical unit 79, which generates an image of the sample 41 on the detector device 60.

The detector device 60 comprises a plurality of detector elements 61, 62, wherein each partial beam of the sample light 45 impinges on a plurality of detector elements. Some detector devices 60 require darkness during the read-out of the detector elements. Therefore, the AOTF 12 can be driven for reducing the intensity of the illumination light 15 or setting it to 0 if the detector elements are read.

In order to guide illumination light 15 successively onto different regions of the sample 41, the first optical arrangement 51 and the pinhole stop arrangement 55 are rotated jointly. The partial beam emerging from an optical element 71 is displaced in this way, which is designated as illumination scanning movement.

Jointly with the first optical arrangement 51 and the pinhole stop arrangement 55, the second optical arrangement 52 is rotated in a common direction. For this purpose, these three rotatable disks 51, 52, 55 are mechanically rigidly coupled to one another on a common driveshaft 65.

By means of rotation of the disks 51, 52, 55 and also by means of the specific design of the optical elements 71, 72, a detection scanning movement is achieved which is opposite to the illumination scanning movement on account of the design of the optical elements 71, 72.

This will be explained in greater detail with reference to FIGS. 3 and 4.

FIG. 3 schematically shows components of the light microscope from FIG. 2. The illustration shows a beam path of the illumination light 15 from the beam splitter 17 to the intermediate image plane 70 and a beam path of the sample light 45 from the intermediate image plane 70 to the detector device 60.

While the two optical arrangements 51, 52 have a multiplicity of optical elements 71 and 72, as illustrated in FIG. 2, FIG. 3 shows solely the beam path for a partial beam of the illumination light 15 and of the sample light 45. The beam path illustrated applies in the same way to the other optical elements 71, 72 which are illuminated as illustrated in FIG. 2.

It should be noted that FIG. 3 is not true to scale. In this regard, the beam splitter 17 is large enough that reflected illumination light 15 can pass from the beam splitter 17 onto a plurality of optical elements 71 arranged alongside one another. The focusing optical unit 79 is also large enough that a plurality of partial beams of the illumination light 15 can be guided by it onto the detector device 60.

In the case of the embodiment illustrated, the optical element 71 comprises a converging lens and the optical element 72 comprises a diverging lens. The lenses 71, 72 generate a non-inverted virtual image of the intermediate plane 70, from which image the focusing optical unit 79 forms a real image on the detector device 60. In this case, the focusing optical unit 79 can image either in a non-inverting manner or in an inverted manner.

The illumination light 15 that impinges on the converging lens 71 as a parallel beam is focused into the intermediate image plane 70 by the converging lens 71. An intensity profile of the illumination light in the intermediate image plane 70 is illustrated as curve 44. The imaging of a sample point 42 into the intermediate image plane 70 is additionally shown. In the situation illustrated, the maximum of the intensity curve 44 of the illumination light 15 is situated exactly at the sample point 42. Furthermore, here infinitely sharp, imaging 160 of the detector device 60 is illustrated in the intermediate image plane 70. The detector elements 61, 64 are imaged into the positions 161 and 164 in the intermediate image plane 70. In this situation, the detector element 61 thus principally receives light from the sample point 42.

FIG. 4 shows the components from FIG. 3 at a different point in time. In this case, the optical elements 71, 72 of the scanning device were moved in a common direction. The remaining components are stationary.

By virtue of the fact that the lens 71 was moved upward from FIG. 3 to FIG. 4, the intensity distribution 44 of the illumination light 15 in the intermediate plane 70 is also displaced upward. Accordingly, the maximum of the intensity distribution 44 no longer lies at the sample point 42, but rather above the latter. The travel of the displacement of the intensity distribution 44 in the intermediate image plane 70 is equal to the travel of the movement of the lens 71 because the latter focuses the illumination light 15, initially passing as a parallel beam, onto a region which lies on a central or optical axis 77 of the lens 71.

As a result of the displacement of the lenses 71, 72, a displacement of the imaging of the detector elements is achieved as well. In this regard, the stationary detector element 61 in FIG. 4 is situated below the central axis or optical axis 77 running centrally through the lenses 71, 72. Since the lenses 71, 72 image in a non-inverting manner, an imaging 161 of the detector element 61 is likewise situated below the optical axis 77. The imaging 161 or the location 161 can also be interpreted as the midpoint of the receiving region of the detector element 61. Since an imaging is not generated infinitely sharply, the detector element 61 also receives light from an extended region around the location 161. This receiving region can be defined as an Airy disk onto which the detector element 61 is imaged in the intermediate image plane 70.

If the lenses 71, 72 generated an imaging with an imaging scale of 1, then the detector element 61 would also be imaged onto the sample point 42 in the intermediate image plane 70 in FIG. 4. However, the imaging scale of the lenses 71, 72 is less than 1. As a result, in FIG. 4 the imaging 161 of the detector element 61 is situated further below the optical axis 77 and the detector element 61. For this purpose, the light-diverging lens 72 can have a focal length whose absolute value is half that of the light-converging lens 71. The two lenses 71, 72 can also be referred to as a Galilean telescope.

If the lenses 71, 72 are moved upward, therefore, a receiving region of a specific detector element shifts downward in the intermediate image plane 70. The displacement of the detector element imaging 161, which can also be regarded as a displacement of the center of the receiving region of the detector element 61, can be referred to as detection scanning movement. With regard to the stationary sample point 42, a detection scanning movement downward took place from FIG. 3 to FIG. 4, cf. positions of the imagings 161. By contrast, the illumination scanning movement, that is to say the displacement of the intensity curve 44, took place upward.

Figure 1:
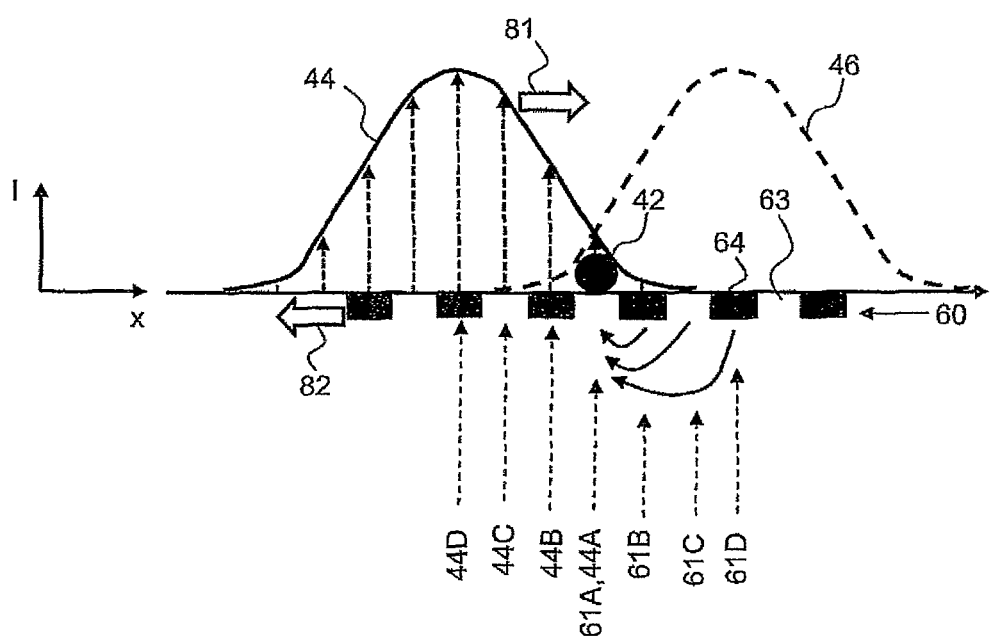
FIG. 1 shows the principle of signal production in the case of detector elements which are at a distance from one another of less than one Airy.

As explained with reference to FIG. 1, the light intensity received by the detector element 61 is determined by a total point spread function whose maximum lies between the intensity curve 44 of the illumination light 15 and the location of the imaging 161. The maximum of the total point spread function is intended to be as stationary as possible in the case of an illumination scanning movement as a result of the simultaneous detection scanning movement. For this purpose, the lenses 71, 72 preferably generate an imaging with a scale of 1:2. As a result, the speeds and the covered distances of the illumination scanning movement and the detection scanning movement in the intermediate image plane 70 are identical in terms of absolute value.

If the optical elements 71, 72 image with an imaging scale of 1:2, then the sample image recorded by the detector device 60 during the implementation of the illumination and detection scanning movements is, however, not about half the size of the sample image in the intermediate plane 70. Rather, it is of the same size as long as a focusing optical unit possibly present images with a scale of 1:1. This is owing to the fact that the intermediate image plane 70 is not illuminated uniformly with illumination light. Rather, that region of the intermediate image plane 70 from which a specific detector element receives the greatest quantity of light also depends on the location of the illumination spot 44 in the intermediate image plane 70. As a result of the illumination and detection scanning movements, therefore, what is achieved in the case of an imaging scale of 1:2 is that the image of the sample recorded by the detector device 60 is of the same size as the image of the sample in the intermediate image plane 70.

In the case of the light microscope according to the invention, it is advantageous that no optical components have to be moved in opposite directions in order to achieve opposite directions of the illumination scanning movement and the detection scanning movement. Rather, it already suffices if the optical elements 71, 72 are moved at the same speed in a common direction. Therefore, high speeds of the scanning movements can be achieved with means that are simple in terms of apparatus.

In a modification of the embodiment from FIGS. 3 and 4, the optical elements 71, 72 are formed with mirrors or light-diffracting elements instead of lenses. By way of example, the optical element 71 can be a lens, and the optical element 72 a mirror. In this case, sample light reflected back from the mirror 72 can be guided in the direction of the detector device 60 by a further beam splitter.

The optical element 71 can also be a mirror. In this case, firstly a first beam splitter is used to guide illumination light reflected back from the mirror 71 to the sample. Sample light can be guided via the first beam splitter to the mirror 71 and then in the direction of the optical element 72 by a second beam splitter.

A mirror 71 can also be provided with a hole in the center, whereby the pinhole stop arrangement can be replaced.

In addition, the components illustrated in FIGS. 3 and 4 can also be used with optical arrangements which are not embodied as rotatable disks. Rather, any other one- or two-dimensional arrangements of optical elements can be provided. These arrangements need not be rotated, but rather can be moved jointly in any desired manner, for example linearly or in a zigzag form.

A further exemplary embodiment of a light microscope 100 according to the invention is described with reference to FIGS. 5 and 6. The light microscope can correspond to that from FIG. 2, wherein two further optical arrangements each having a plurality of optical elements are present between the optical arrangement 52 and the detector device 60. The focusing optical unit 79 can be omitted in this case. The two further optical arrangements can be embodied as disks like the first and second optical arrangements 51, 52, which disks can likewise be rotated by the driveshaft 65.

FIG. 5 shows the beam paths of a partial beam of the illumination light 15 and of a partial beam of the sample light 45. As in the case of FIGS. 3 and 4, too, here the illumination light 15 is focused by a light-converging lens 71 here, however, the sample light 45 is imaged onto the detector device 60 via the lenses 71 to 74. The lenses 71 to 74 each have a light-converging effect. As a result, the lenses 71, 72 can form a first Kepler telescope, and the lenses 73, 74 a second Kepler telescope. The first Kepler telescope generates an inverted imaging, which is imaged once again in an inverted manner by the second Kepler telescope. As a result, therefore, the optical elements 71 to 74 of the scanning device generate a non-inverted imaging.

This constitutes a fundamental difference with respect to known microscopes which use two disks with microlens arrays. In this regard, the two disks from EP 1 359 452 A1 have light-converging microlenses. As a result, the movable components generate an inverting imaging. In addition, the imaging scale is not less than 1. In contrast, the movable components in the case of the invention image in a non-inverting manner and with an imaging scale of less than 1.

FIG. 6 shows a situation in which the lenses 71 to 74 of the scanning device were moved upward. As a result, an illumination scanning movement and a detection scanning movement are produced in the intermediate image plane 70. In this case, the descriptions regarding the illumination and detection scanning movements between FIGS. 3 and 4 are correspondingly applicable to the exemplary embodiment in FIGS. 5 and 6.

Figure 7:
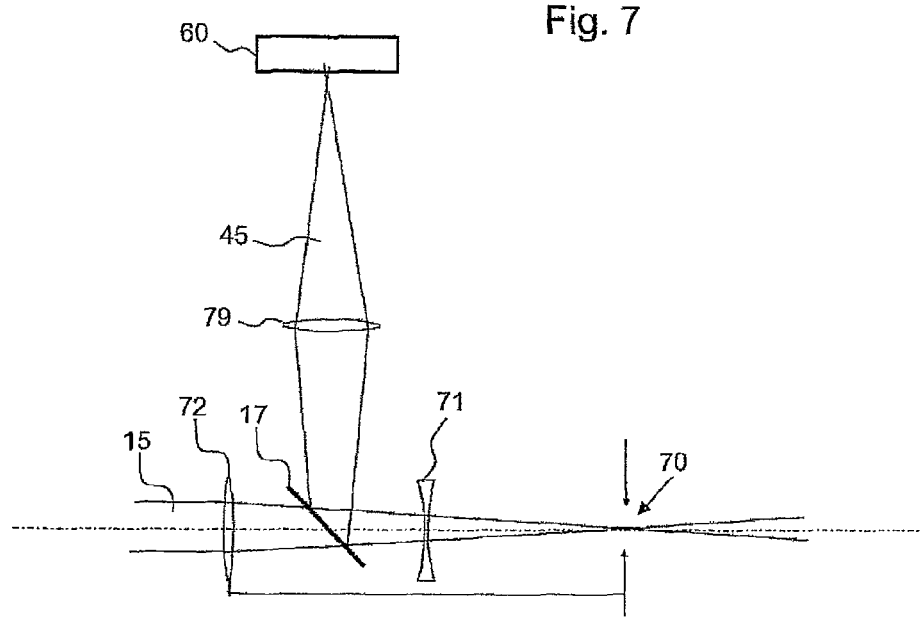
FIG. 7 shows components of yet another embodiment of a light microscope according to the invention, wherein the scanning device is situated in a specific position.
Figure 8:
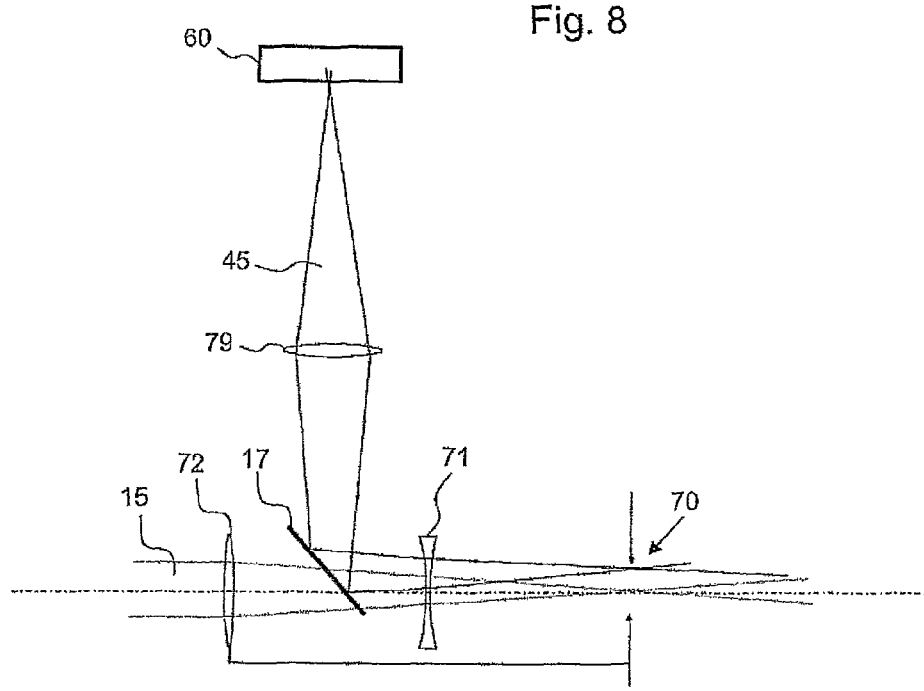
FIG. 8 shows the components from FIG. 7, wherein the scanning device is situated in a different position than in the case of FIG. 7.

FIGS. 7 and 8 show one exemplary embodiment in which illumination light 15 is guided via optical elements 72 of the second optical arrangement to optical elements 71 of the first optical arrangement and further to the intermediate image plane 70. The optical element 72 is a converging lens and the optical element 71 is a diverging lens. The diverging lens 71 generates with the sample light 45 a non-inverted, virtual imaging. The sample light 45 is guided to the detector device 60 via a beam splitter 17, without passing to the converging lens 72. By means of a stationary focusing optical unit 79, the sample light 45, that is to say the partial beams of the sample light 45 which are guided via the various diverging lenses 71, is imaged onto the detector device 60.

In comparison with FIG. 7, the lenses 71, 72 in FIG. 8 have been moved downward. The illumination scanning movement has thus likewise taken place downward in the intermediate image plane 70. It is evident that, by contrast, the detection scanning movement has taken place upward.

As shown by the embodiments, the specific number of optical elements 71 to 74 and therefore of optical arrangements 51, 52 is not crucial. Rather, what is critical is that the movable optical elements 71 to 74 of the scanning device 50 which guide the sample light 45 to the detector device 60 generate a non-inverted imaging. This imaging can be virtual, as in FIGS. 3 and 4, and also 7 and 8, or real, as in FIGS. 5 and 6. A possibly subsequent imaging by a focusing optical unit 79 can be carried out in an inverting or non-inverting manner.

In addition, for the sample light the imaging scale of the entire imaging which is generated by the optical elements 71 to 74 of the scanning device must be less than 1. In the case of an imaging scale of greater than 1, the illumination scanning movement and the detection scanning movement would take place at different speeds in the same direction. It is only starting from an imaging scale of less than 1 that the directions are opposite. Preferably, the imaging scale is 0.5, as a result of which the illumination scanning movement and the detection scanning movement are opposite and are identical in terms of absolute value in respect of their speed.

As a result, the detector elements can integrate a received signal further, while the optical elements of the scanning device are moved. In contrast to the prior art, therefore, it is no longer necessary to read the detector elements separately for each measurement position of the optical elements of the scanning device. In particular, the detector elements can integrate continuously until a scan is concluded with all the optical elements of the optical arrangements. The image or raw image subsequently read out has a particularly high resolution, without further computation measures being required.

Advantageously, therefore, the resorting of the received signals which was described with reference to the prior art can be omitted. Consequently, a high-resolution image of the sample can be recorded in a particularly short time.

Figure 9:
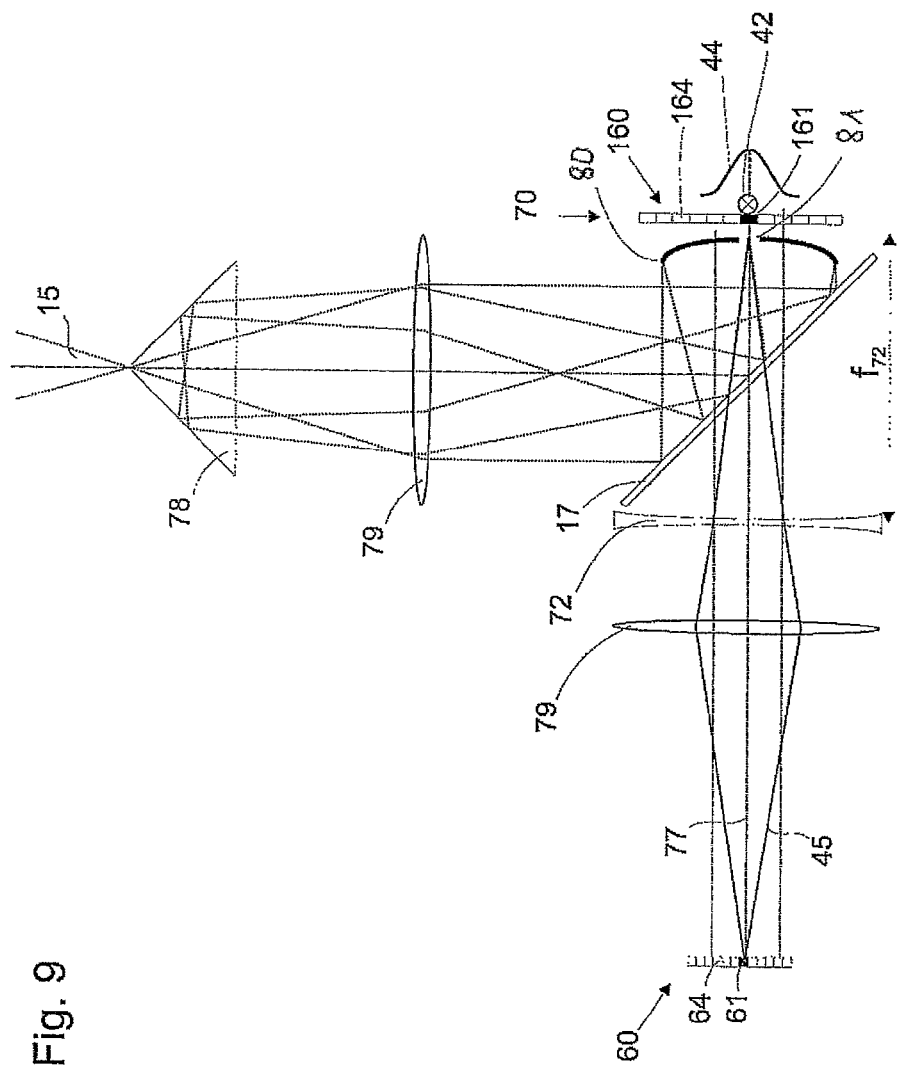
FIGS. 9, 10 show a further advantageous embodiment.
Figure 10:
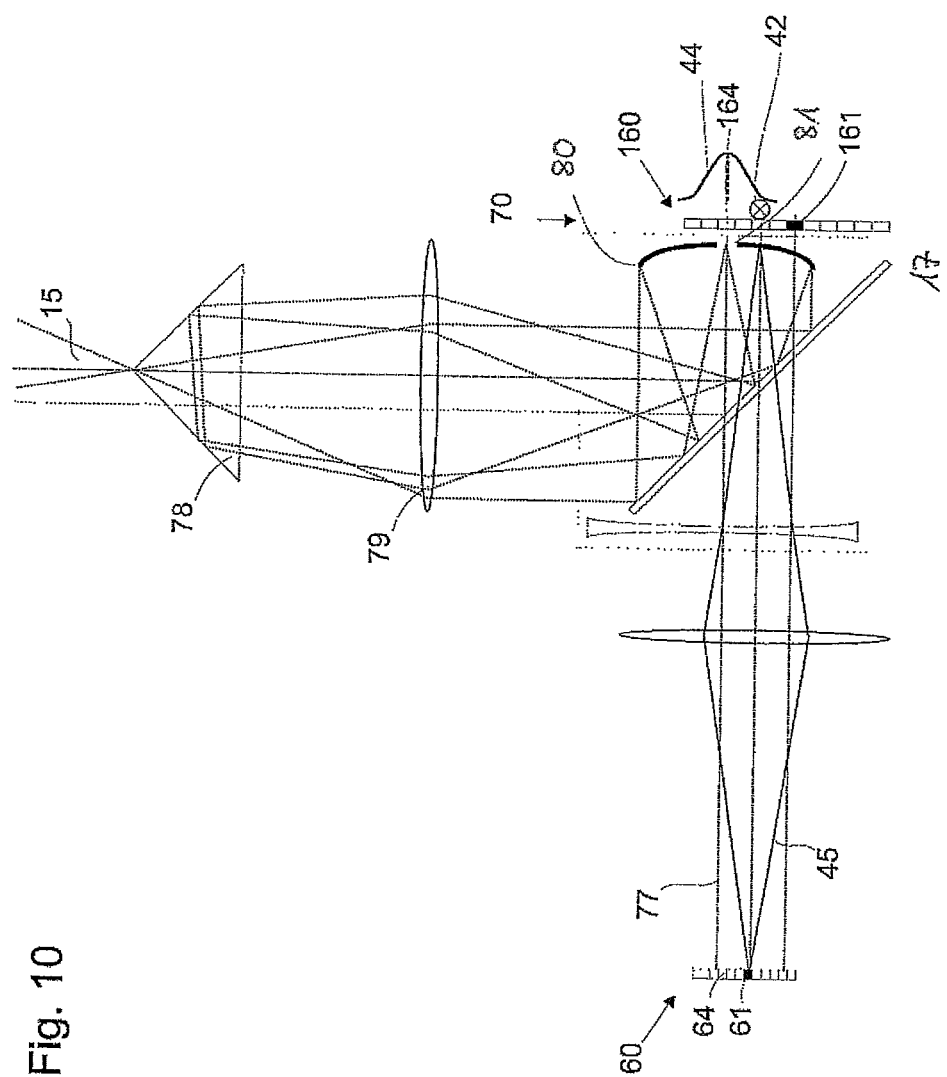

In a further embodiment in accordance with FIGS. 9 and 10, the illumination light 15 being concentrated onto a point (by an optical unit not illustrated) is coupled into the arrangement through the flattened vertex of a retroreflector prism 78. The divergent light emanating from the input coupling point is deflected by a beam splitter 17 after collimation by 79. On that radial region of the disk which is swept over by the illuminated field during the rotation, there is situated an arrangement of focusing micromirrors (illustrated schematically), the center of which in each case has an opening 81 allowing the light to pass through. A small portion of the light incident on each of the micromirrors (corresponding to the area of the through opening in relation to the total area of the respective concave mirror) passes through the mirror through said opening already upon the first impingement and from there passes via the microscope beam path onto the sample (not illustrated). The largest portion of the light is reflected back by the concave micromirrors 80, however, wherein a focal pattern that rotates with the disk arises in the focal plane of the concave micromirrors. Since the focal pattern lies in or near the (front) focal plane of the optical unit 79, it is imaged into infinity by the latter and passes to the prism 78, where it is reflected again. In this case, the non-reflecting, flattened vertex of the prism 78 corresponds to the image of the central opening of each of the concave micromirrors 80.

If the prism 78 were situated with its flattened vertex exactly in the (back) focal plane of the optical unit 79, the beam sent back on the same path via beam splitter 17 and optical unit 79 onto the micromirrors 80 again would be collimated again there and reflected back a further time. However, if the prism 78 is suitably moved a little out of the focal plane of the optical unit 79, the telecentric foci fall in each case on the transparent through openings in the center of the concave micromirrors 80, are transmitted there and directed onto the sample as a rotating point pattern via the microscope beam path. The light returned from the sample (by reflection or fluorescence) is transmitted through the openings 81 in a manner spatially filtered by the beam splitter 26 and is then imaged onto the detector by means of a further optical arrangement. The task of the prism 78 can also be performed by a mirror, which, however, then cannot be positioned in the focal plane of the optical unit 79 (this would mean that the micromirrors and their image would rotate in a point-mirrored manner relative to one another), but rather only behind a further projection unit which generates an image of the rotating focal pattern of the micromirrors in or near the plane of a plane mirror. Here, too, the mirror must be moved slightly out of the focal plane of the optical arrangement in order that the image of the focal pattern of the micromirrors 80 becomes located in the through openings.

Furthermore, a location analogous to the flattened vertex of the prism 78 must be provided, via which the illumination beam, here only of point size, can be coupled in.

Analogously to the movement of the lenses 71, 72 in FIGS. 3 and 4, in accordance with FIG. 9 and FIG. 10 a displacement of the intensity distribution of the illumination light is carried out by means of a common offset of the position of the micromirror 80 and of the diverging microlens 72 perpendicular to the optical axis in order to achieve a diametrical displacement between the imaging of the detector elements and of the illumination light.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

10 Light source
11 Mirror staircase with partly transmissive mirrors or color splitters
12 Acousto-optical tunable filter (AOTF)
14 Polarization variator
15 Illumination light
16 Telescope for beam expansion
17 Beam or chromatic splitter
20 Tube lens
21 Deflection means
30 Objective
40 Sample plane
41 Sample
42 Sample point, fluorescent object of the sample
44 Intensity distribution of an illumination spot
44A-44D Different positions of the intensity distribution 44 of the illumination light
45 Sample light
46 Curve of the reception sensitivity of a detector element 48 Sample displacement unit
50 scanning device
51 first optical arrangement
52 second optical arrangement
55 Pinhole stop arrangement
60 Detector device
61-64 Detector elements
61A-61D Positions of the detector elements imaged into the sample plane
65 Driveshaft
70 Intermediate image plane
71 Optical element of the first optical arrangement
72 Optical element of the second optical arrangement
73 Optical element of the third optical arrangement
74 Optical element of the fourth optical arrangement
75 Pinhole stop
77 Optical axis of the optical elements of the scanning device
78 Retroreflector prism
79 Focusing optical unit
80 Micromirror arrangement
81 Opening in the micromirror
100 Light microscope
160 Imaging of the detector device 60
161 Imaging of the detector element 61
164 Imaging of the detector element 64

What is claimed is:

1. An optical microscope comprising a sample plane in which a sample to be examined is positionable, a light source for emitting illumination light, optical imaging means for guiding the illumination light into the sample plane, and a detector device having a plurality of detector elements for the purpose of detecting sample light coming from the sample, wherein adjacent detector elements are at a distance from one another which is smaller than an Airy disk produced by a point of the sample plane on the detector device, a scanning device having at least one first and one second optical arrangements, said optical arrangements being simultaneously movable in a common direction for the purpose of producing an illumination scanning movement and a detection scanning movement, said illumination and said detection scanning movements being opposite to one another, wherein the illumination scanning movement is a scanning movement of illumination light over the sample plane, and wherein as detection scanning movement receiving regions of the detector elements are movable over the sample plane, said first and second optical arrangements each have a plurality of optical elements which are arranged alongside one another and by means of which sample regions spaced apart from one another are simultaneously examinable, said first and second optical arrangements being arranged such that both a beam path of the sample light from the sample plane to the detector device and a beam path of the illumination light from the light source to the sample plane run via the first optical arrangement and only one of these two beam paths runs via the second optical arrangement.

2. The optical microscope as claimed in claim 1, wherein the imaging scale is 1:2.

3. The optical microscope as claimed in claim 1 wherein for the purpose of the non-inverted imaging, the first or second optical arrangements each have a light-converging effect and the optical elements of the other optical arrangement each have a light-diverging effect for the purpose of the non-inverted imaging.

4. The optical microscope as claimed in claim 1 wherein the scanning device has a third optical arrangement, which comprises one or a plurality of image field rotators and is arranged in the beam path of the sample light and wherein, inverted imagings are generable by means of the first optical arrangement or by means of the first and second optical arrangements, which inverted imagings are convertible into non-inverted imagings by the image field rotation of the image field rotator or rotators.

5. The optical microscope as claimed in claim 4, wherein the scanning device has a third and a fourth optical arrangement as image field rotators, said optical arrangements each having an optical element for each of the optical elements of the first optical arrangement.

6. The optical microscope as claimed in claim 4, wherein the beam path of the sample light from the sample plane to the detector device runs via the first and second optical arrangements, and wherein the optical elements of the first and second optical arrangements each have a light-converging effect.

7. The optical microscope as claimed in claim 1, further comprising a pinhole stop arrangement, which is movable jointly with the first and second optical arrangements for generating a confocal sample image between the first optical arrangement and the sample plane, said pinhole stop arrangement having a respective pinhole stop for each optical element of the first optical arrangement.

8. The optical microscope as claimed in claim 1, wherein the optical arrangements of the scanning device are embodied in each case by a rotatable disk.

9. The optical microscope as claimed in claim 8, wherein said rotatable disks are mounted on a common driveshaft.

10. The optical microscope as claimed in claim 1, further comprising an actuating device for linearly displacing the optical arrangements of the scanning device.

11. The optical microscope as claimed in claim 1, wherein said optical elements of the first optical arrangement are formed in each case by at least one lens, a mirror or a light-diffracting element, and wherein said optical elements of the second optical arrangement are formed in each case by at least one lens, a mirror or a light-diffracting element.

12. The optical microscope as claimed in claim 1 wherein said scanning device has a zoom optical arrangement which is movable jointly with the first optical arrangement and which is arranged such that the sample light solely passes through said zoom optical arrangement during operation.

13. The optical microscope as claimed in claim 1, further comprising a mirror or prism provided as a retroreflector in the illumination beam path, wherein the illumination light passes through the retroreflector in the direction of micromirrors which have a pinhole stop for passing a portion of the illumination light in the direction of the sample.

14. A microscopy method for examining a sample positioned in a sample plane of an optical microscope, comprising guiding illumination light into the sample plane moving the illumination light as illumination scanning movement over the sample plane, detecting sample light coming from the sample by means of a detector device having a plurality of detector elements, wherein adjacent detector elements are at a distance from one another which is smaller than an Airy disk produced by a point of the sample plane on the detector device simultaneously moving optical arrangements of a scanning device in a common direction for producing said illumination scanning movement and a detection scanning movement, said illumination scanning and detection scanning movements being opposite to one another, wherein as detection scanning movement receiving regions of the detector elements are moved over the sample plane, said sample regions being spaced apart from one another are examined simultaneously by means of the first and second optical arrangements, each having a plurality of optical elements arranged alongside one another, said first and second optical arrangements being arranged such that illumination light and sample light are guided via the first optical arrangement, said second optical arrangement being arranged so that only either illumination light is guided toward the sample plane or sample light is guided toward the detector device.

15. The microscopy method as claimed in claim 14, further comprising carrying out the illumination scanning movement and the detection scanning movement during an integration time of detector elements of the detector device.

16. The optical microscope as claimed in claim 1 wherein sample light is imageable in a non-inverting manner and with an imaging scale of less than 1 by means of the scanning device in order to achieve a direction of the detection scanning movement which is opposite to the direction of the illumination scanning movement.

17. The microscopy method as claimed in claim 14 further comprising imaging said sample light in a non-inverting manner and with an imaging scale of less than 1 in order to achieve a direction of the detection scanning movement which is opposite to the direction of the illumination scanning movement by means of said scanning device.

* * * * *